United States Patent
Lee et al.

(10) Patent No.: US 8,340,797 B2
(45) Date of Patent: Dec. 25, 2012

(54) METHOD AND SYSTEM FOR GENERATING AND PROCESSING DIGITAL CONTENT BASED ON TEXT-TO-SPEECH CONVERSION

(75) Inventors: Dong Hoon Lee, Seoul (KR); Jun Hee Kim, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 1043 days.

(21) Appl. No.: 12/010,068

(22) Filed: Jan. 18, 2008

(65) Prior Publication Data

US 2008/0312760 A1    Dec. 18, 2008

(30) Foreign Application Priority Data

Jun. 15, 2007  (KR) .................. 10-2007-0058764

(51) Int. Cl.
  *G06F 17/00* (2006.01)
  *G10L 13/00* (2006.01)
  *G10L 13/08* (2006.01)
  *G10L 21/00* (2006.01)
  *G01L 11/00* (2006.01)

(52) U.S. Cl. ........... 700/94; 704/258; 704/260; 704/270

(58) Field of Classification Search .............. 700/94; 84/601; 704/201, 258, 260, 261, 270, E19.007, 704/E13.001

See application file for complete search history.

(56) References Cited

U.S. PATENT DOCUMENTS

| | | | |
|---|---|---|---|
| 5,899,975 A | 5/1999 | Nielsen | |
| 6,529,873 B1 * | 3/2003 | Owen | 704/260 |
| 6,947,044 B1 * | 9/2005 | Kulas | 345/473 |
| 7,386,453 B2 * | 6/2008 | Polanyi et al. | 704/270 |
| 2003/0009339 A1 * | 1/2003 | Yuen et al. | 704/260 |
| 2003/0028378 A1 * | 2/2003 | August et al. | 704/260 |
| 2005/0096909 A1 | 5/2005 | Bakis et al. | |

FOREIGN PATENT DOCUMENTS

WO    WO-2004/077381 A1    9/2004

OTHER PUBLICATIONS

W3C, "Speech Synthesis Markup Language (SSML) Version 1.0", Sep. 7, 2004, W3C, Version 1.0, pp. 1-3, 11, 21-22.*
Walsh P. et al., "Speech Enabled E-Learning for Adult Literacy Tutoring", Proceedings of the 3rd IEEE International Conference on Advanced Learning Technologies (ICALT'03), pp. 17-21, (2003).
Nguyen et al., "CoMobile: Collaborative Learning with Mobile Devices", Proceedings of the Sixth International Conference on Advanced Learning Technologies (ICAL'06), pp. 355-359, 2006.

* cited by examiner

*Primary Examiner* — Jesse Elbin
(74) *Attorney, Agent, or Firm* — Birch, Stewart, Kolasch & Birch, LLP (57) ABSTRACT

A method and system is provided for generating digital content using text-to-speech (TTS) conversion. A predetermined script is selected using a portable terminal or user personal computer (PC). A format for converting the selected script into an audio data file is determined. The selected script is generated into the audio data file according to the determined conversion format of the audio data file using a TTS engine provided to at least one of the user PC and a web server.

20 Claims, 5 Drawing Sheets

METHOD AND SYSTEM FOR GENERATING AND PROCESSING DIGITAL CONTENT BASED ON TEXT-TO-SPEECH CONVERSION

CROSS-REFERENCE TO RELATED APPLICATIONS

The present application claims priority under 35 U.S.C. 119 and 35 U.S.C. 365 to Korean Patent Application No. 10-2007-0058764 (filed on Jun. 15, 2007), which is hereby incorporated by reference in its entirety.

BACKGROUND

The present disclosure relates to generating and processing of digital content.

In general, a content server connected to the Internet services its own content, which is constructed as a database by converting off-line documents into web documents, or content, which is searched over the Internet and is suitable for the request of a user, to a computer of the user. The user searches for his/her wanted content after accessing to the content server connected to the Internet using any portable terminal capable of reproducing media, downloads the searched content through the portable terminal, and reproduces the downloaded content into images or sounds through an output unit of the portable terminal. Meanwhile, the content provided from the content server can made up of images, sounds, text, data provided from service channel broadcasting, and so on. The use of the content is limited according to the service scope of a content provider. If text and sound data synchronized to the text are provided together as the content provided by the content server, the user of the portable terminal can selectively use a wanted one of the text and sound data sources. However, if the particular content provided by the content server includes only text related data, the user can merely see the content in the text through the portable terminal, but not use audio output of the text immediately when he/her wants to do so. Especially, even when the user wants to hear foreign news in a corresponding foreign language while reading the foreign news, the user can not immediately hear the foreign news in the corresponding foreign language if the content associated with the foreign news does not includes an audio file for the corresponding foreign language. As such, this content is limited to the use for language training or learning.

An interface technique, a text-to-speech (TTS) technique, of converting text on a web server into voice is applied to personal computers, portable terminals, or content servers, so that they convert selected text into voice and output the converted voice. However, this technique merely functions to convert selected text into voice, but fails to service the selected text as a sound file which the user wants. In particular, if the user intends to learn the foreign language using the sound file corresponding to a selected script serviced from the web server over the Internet, the selected script is preferably adapted to be provided with a suitable sound file corresponding to a level requested by the user or a linguistic ability level of the user. However, this request is not yet met.

SUMMARY

Accordingly, the embodiment is directed to a method and system for generating and processing digital content, in which a predetermined script designated by a user is converted into an audio data file corresponding to a user level, and the converted audio data file is stored, thereby making it possible to do language learning suitable for the user level using the stored audio data file.

According to embodiments, a method and system for generating and processing digital content, in which a script prepared by a user or a predetermined script that a user designates from a script on a webpage provided by a web server connected to an Internet is converted into an audio data file corresponding to a user level, and the converted audio data file is stored, thereby making it possible to do language learning suitable for the user level using the stored audio data file.

According to an embodiment, a system for generating and processing digital content comprises: a script selector that selects a predetermined script; a file format determiner that determines a format for converting the selected script into an audio data file; an audio data file generator that generate the audio data file corresponding to the selected script according to the determined format of the audio data file.

According to an embodiment, a method for generating digital content comprises the step of: selecting a predetermined script; determining a format for converting the selected script into an audio data file; and converting the selected script into the audio data file according to the determined conversion format of the audio data file.

According to an embodiment, a method for generating and processing digital content comprises the steps of: selecting a predetermined script; determining a format for converting the selected script into an audio data file; converting the selected script into the audio data file according to the determined conversion format of the audio data file; and reproducing the converted audio data file.

According to an embodiment, a method for processing digital content, the method comprising the steps of: selecting a predetermined script; setting a format for converting the selected script into an audio data file; converting the selected script into the audio data file according to the set conversion format, and describing information expressing the conversion format together with audio data as metadata; and providing the audio data file together with the metadata.

With the method and system for generating and processing digital content according to the embodiments, the audio data file corresponding to the level set by the user is generated from the script prepared by the user, and is stored, so that the generated audio data file is allowed not only to be used in the language learning suitable for the user level but also be downloaded to the portable terminal. Accordingly, the user can do the language learning suitable for the user level using the portable terminal during movement.

BRIEF DESCRIPTION OF THE DRAWINGS

The accompanying drawings, which are included to provide a further understanding of the invention and are incorporated in and constitute a part of this application, illustrate embodiment(s) of the invention together with the description, and serve to explain the principle of the invention.

DETAILED DESCRIPTION OF THE EMBODIMENTS

Hereinafter, embodiments will be described in detail with reference to the accompanying drawings. The case in which a user directly generates an audio file from a script will be described as the embodiment. In view of the fact that the user directly generates the audio file, i.e. digital content, the audio file may be understood as user generated content (UGC). However, the term "UGC" described in this embodiment is provided merely to help understand the invention, and so the invention is not limited to such term.

Figure 1:
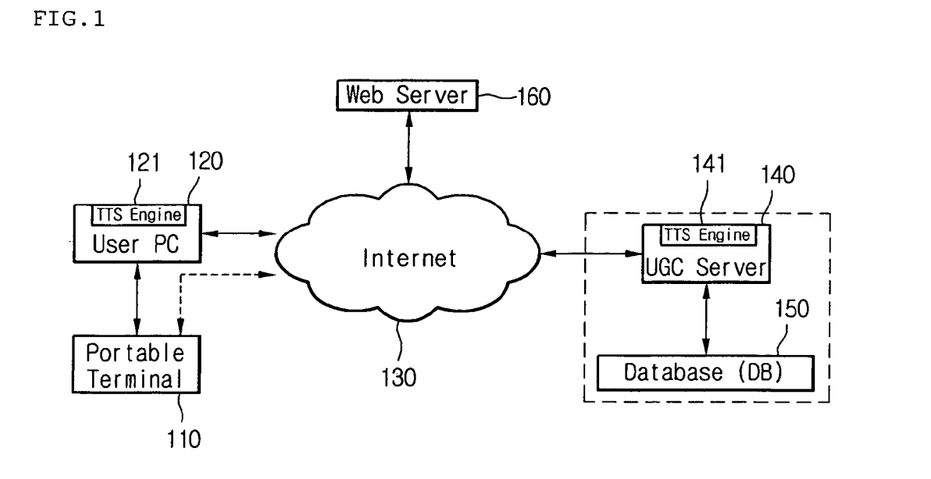
FIG. 1 is a view illustrating a system for generating and processing digital content according to an embodiment.

Referring to FIG. 1, a system of generating and operating UGC according to an embodiment comprises at least one portable terminal 110 or user personal computer (PC) 120 that selects a predetermined script for generating an audio file, a user interface that is provided through the portable terminal 110 or user PC 120 in order to determine an audio data file format for the selected script, and a text-to-speech (TTS) engine 121 or 141 that is provided to at least one of the portable terminal 110 or user PC 120, and a UGC server in order to generate an audio data file corresponding to the selected script according to the determined audio data file format.

Here, the portable terminal 110 includes at least one selected from personal digital assistant (PDA), pocket PC, handheld PC (HPC), web pad, laptop computer, and e-book terminal, all of which is an information processing appliance available while thus user moves, and generally has a function of reproducing multimedia including video, audio, and so on. The predetermined script is one selected from a script prepared by the user and a script on a webpage provided from at least one web server connected to the Internet. In the case of the script on the webpage, an entire script of the webpage or a partial script within a region designated by the user is selected.

A variety of programs for processing variously input instructions are stored in or installed to the portable terminal 110 or user PC 120. The UGC server 140 supports function of uploading and downloading the UGC requested by the plurality of portable terminals 110 or user PCs 120 connected to each other through the Internet 130. A database 150 connected with the UGC server 140 databases and stores content, which is generated by the UGC server 140 or is uploaded to the UGC server 140, and provides content corresponding to the requests of the plurality of portable terminals 110 or user PCs 120. Meanwhile, the plurality of web servers 160 store various types of content such as various formats of video, audio, text (scripts), and so forth, and provide content, which corresponds to the request from the portable terminal 110 or user PC 120 or the UGC server 140 that is accessed through the Internet 130, to the corresponding device. The audio file corresponding to the script selected by the user is adapted to be generated either by the TTS engine 121 installed to the user PC 120, or by the TTS engine 141 installed to the UGC server 140. Further, the audio file corresponding to the script selected by the user can be generated by the UGC server 140 on the basis of input of menu items provided by a UGC server's proprietary browser installed to the user PC 120.

Figure 2:
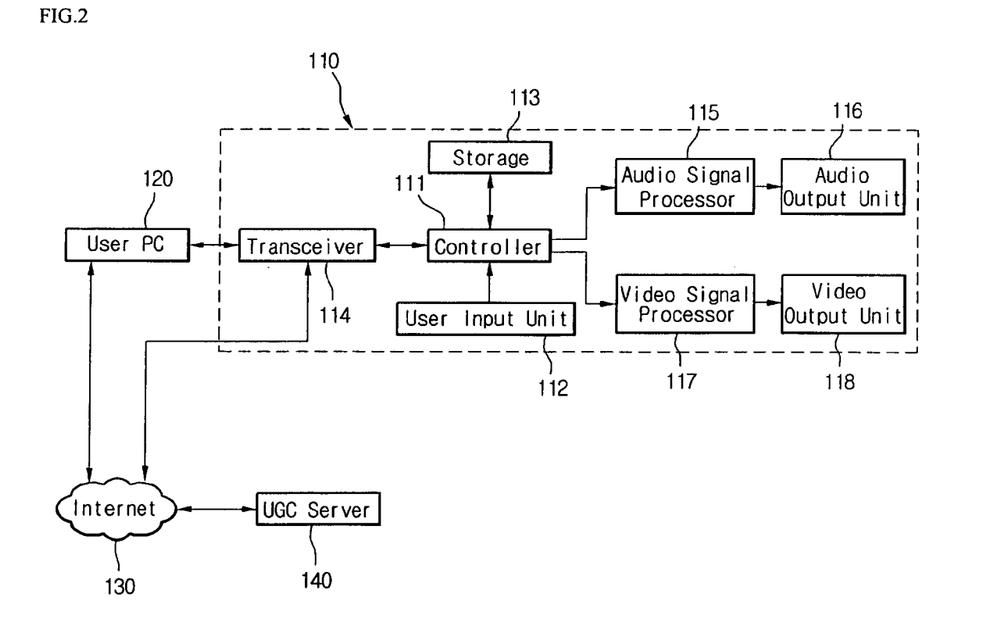
FIG. 2 is a view illustrating the configuration of a portable terminal according to an embodiment.

Referring to FIG. 2, the portable terminal 110 comprises a controller 111, a user input unit 112, a storage 113, a transceiver 114, an audio signal processor 115, an audio output unit 116, a video signal processor 117, and a video output unit 118. The user input unit 112 includes a button part that has a plurality of buttons for selecting and manipulating key buttons corresponding to various functions which the user intends to perform, and an audio recognizer or touch panel that outputs predetermined instruction data corresponding to voice input by the user or a predetermined contact signal. The controller 111 generally controls each element of the portable terminal so as to perform the operation corresponding to the instruction input through the user input unit 112. The storage 113 can include an information memory unit, a memory, required for high-speed data processing, and a hard disk drive (HDD) storing a high capacity of information, and store an operating program and other application programs required for the operation of the portable terminal, and digital content required by the user. The transceiver 114 transmits/receives the data to/from an external device under the control of the controller 111 of the portable terminal according to an interface between the external device and the portable terminal and to a communication protocol. The audio signal processor 115 processes the audio data into an audio signal so as to be suitable for an audio output device, and then outputs the processed audio signal to the audio output unit 116. The audio output unit 116 has a speaker, and outputs voice or sound corresponding to the audio signal output from the audio signal processor 115. The video signal processor 117 processes video data such as video image data, user interface screen, etc. into a video signal so as to be suitable for a video output device, and outputs the video signal to the video output unit 118. The video output unit 118 includes a display device, and is adapted to display the video signal processed by the video signal processor 117 and the user interface screen associated with selection of the operation of the portable electronic appliance on the display device under the control of the controller 111.

Figure 3:
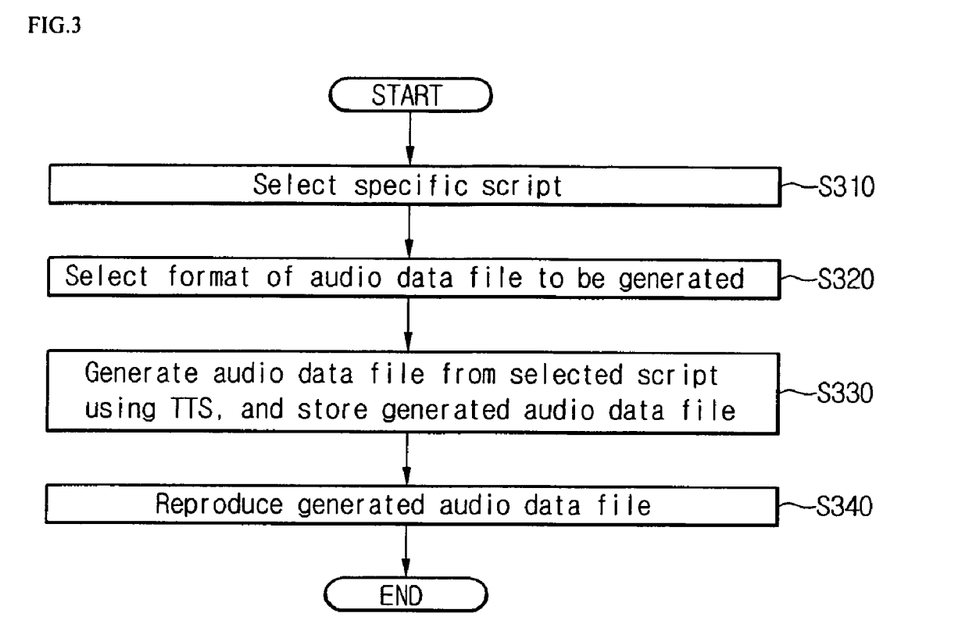
FIG. 3 is a flowchart illustrating the concept of a method for generating and processing digital content according to an embodiment.

FIG. 3 is a flowchart for explaining the concept of a method for generating and operating UGC according to an embodiment. A predetermined script displayed on the video output unit 118 of the portable terminal 110 or the screen of a display unit for the user PC 120 is selected by the user (S310). The predetermined script includes a script that is directly made out by the user, or a script on a webpage that is provided by the web server 160 that services predetermined types of content and is connected through the Internet 130. In the script on the webpage, only the partial script within a preset region of the entire webpage may be selected by a mouse operation signal or a touch panel operation signal of the user. In step S310 of selecting the script, when the predetermined script to be converted into an audio data file is selected by the user, a format of the audio data file to be generated in correspondence to the selected script is newly set, or any one of the previously set formats is selected (S320). The format of the audio data file to be generated in correspondence to the selected script can be set in a format which the user wants using a menu function provided by the portable terminal 110 or user PC 120, or be determined by enabling the user to select any one of the preset conversion formats for the audio data file provided by the UGC server 140 or by enabling the UGC server 140 to select the conversion format for the audio data file suitable for a user's level using user information registered with the UGC server 140.

When the format of the audio data file corresponding to the selected script is determined, a TTS function for converting character (text) information of the selected script into audio information is performed. Thereby, the audio data file corresponding to the selected script is generated and stored in a storage device (S330). The TTS function for converting the selected script into the audio information can be adapted to be performed by the user PC 120 or UGC server 140 or be directly performed by the portable terminal 110. In the case in which the audio data file is generated and stored on the basis of the script by the user PC 120, the user installs a Sync program to the user PC 120 of his/her own, and can download the corresponding audio data file to the portable terminal 110 connected through a universal serial bus (USB) port or a serial port.

On one hand, in the case in which the audio data file is generated by the UGC server 140 and is stored in the database 150 connected to the UGC server 140, the user can download the corresponding audio data file through the user PC 120, connect the user PC 120 of his/her own with the portable terminal 110 using the universal serial bus (USB) port or serial port, download the corresponding audio data file through the transceiver 114, and store the downloaded audio data file in the storage 113. On the other hand, in the case in which the audio data file is generated by the UGC server 140 and is stored in the database 150 connected to the UGC server 140, the portable terminal 110 can be accessed to a wireless Internet or a communication network of a provider, who operates the UGC server 140, through the transceiver 114, directly download the corresponding audio data file, and store the downloaded audio data file in the storage 113.

Afterwards, when the user executes the corresponding audio data file in order to do language learning or audio listening with respect to the corresponding script, the audio signal processor 115 reproduces the corresponding audio data file, and the audio output unit 116 outputs an audio signal corresponding to the script according to the format which the user selects or in the state suitable for a learning level of the user. Thereby, the user can listen to the voice corresponding to the script in a wanted state (S340). Meanwhile, when the audio data file is reproduced, the text data of the script corresponding to the audio data file can be processed into a video signal by the video signal processor 117 according to a user instruction input through the user input unit 112, and be output in synchronization to the output of the audio data file.

The method for generating and operating UGC according to an embodiment can be variously implemented depending on a method of setting the format of the audio data file to be generated in correspondence to the script selected by the user and on a location of the generating means of the audio data file. According to the embodiment, the format of the audio data file to be generated in correspondence to the selected script can be adapted to be set through the user interface screen of the portable terminal 110 or user PC 120 by the user.

Figure 4:
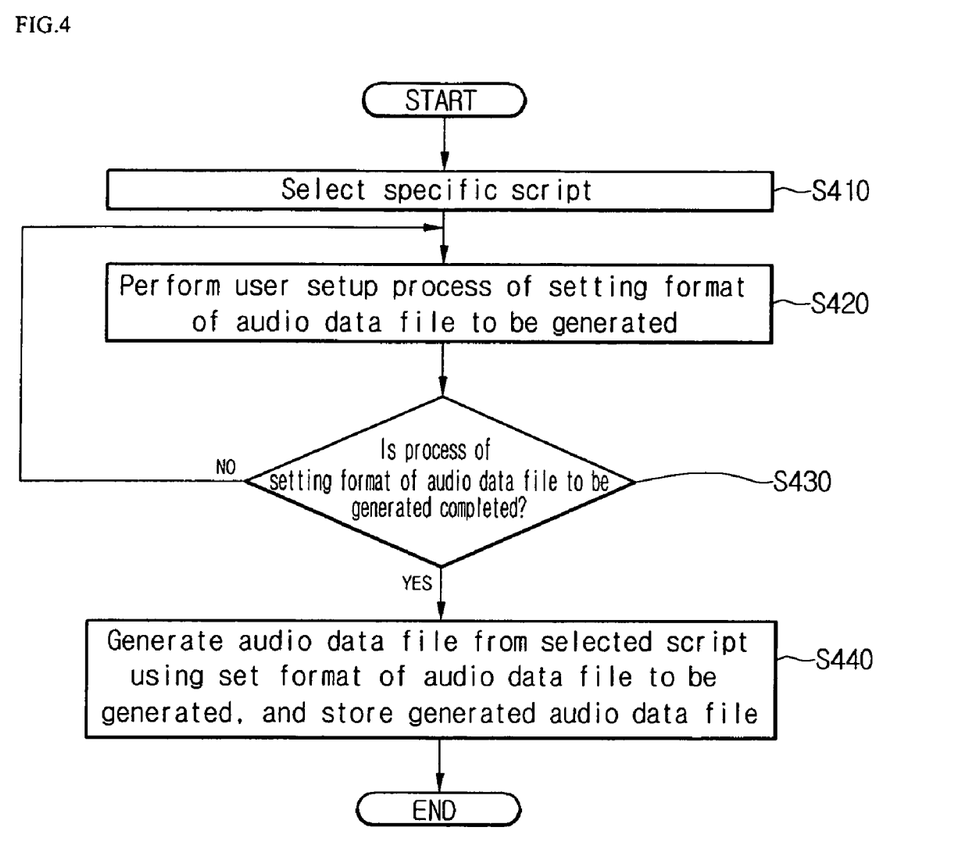
FIG. 4 is a view for explaining a method for generating digital content according to an embodiment.

Referring to FIG. 4, a predetermined script displayed on the screen of the portable terminal 110 or user PC 120 is selected by the user (S410). When the script is selected by the user, a user setup process of setting the format of the audio data file to be generated in correspondence to the selected script is performed (S420). More specifically, in the case in which the user selects the predetermined script displayed on the screen of the portable terminal 110 or user PC 120, the controller of the portable terminal 110 or user PC 120 causes the interface screen to be output such that the user sets the format of the audio data file to be generated in correspondence to the selected script. For example, when the predetermined script is selected, the controller makes it possible to automatically display sub-menu items such as section repetition, speed adjustment, inactivity after reading, etc. for designating the format of the audio data file to be generated in correspondence to the selected script. As one example, the user designates the script of a specific region, or a specific word or sentence that is regarded to be difficult or especially important, and then selects the section repetition among the automatically displayed sub-menu items. Then, the user can set the format of the audio data file to be generated such that audio output for the designated portion can be continuously repeated two or three times.

As another example, in the case in which the user intends to adjust a reading speed of the selected script, the user designates the script of a specific region, or a specific word or sentence, and then selects the speed adjustment among the automatically displayed sub-menu items. In this case, selection items for various speeds are additionally provided for selection of the user, or a speed input interface screen is additionally provided such that the user can input a desired speed. Thereby, thus user can directly set the format of the audio data file to be generated such that the reading speed for the selected script can be output as designated by the user. As yet another example, in the case in which the user intends to insert an inactive section for a predetermined time (e.g. 10 sec.) after the audio output of the selected specific portion, the user selects inactivity for a predetermined time after reading among the sub-menu items displayed in correspondence to the selection of the specific portion. Thereby, the format of the audio data file to be generated reflects such a feature, and thus in the case in which the corresponding audio data file is reproduced, the user can set the format of the audio data file to be generated such that he/she can carefully consider or repeat the output voice of the corresponding specific portion.

Continuously, it is determined whether or not the user setup process of setting the format of the audio data file to be generated is completed (S430). If the user setup process is completed, the TTS function is executed to generate the audio data file using or in the format of the audio data file set for the selected script, and the generated audio data file is synchronized to the corresponding script. Then, the synchronized audio data file is stored in a predetermined storage device (S440). In the case in which the audio data file for the selected script is generated by the execution of the TTS function, the corresponding script information is adapted to be stored together in correspondence to the same format or sequence as the voice output when generated audio data file is reproduced, or a separate script information file is adapted to be generated and stored so as to be synchronized to the audio data file. In other words, when the section repetition function is added, the script of the section is adapted to be repeatedly generated and stored such that it can be also repeated and displayed. The generated audio data file is downloaded to the portable terminal 110, and then is stored in the storage 113. Thereby, the language learning can be efficiently performed using the audio data file suitable to the user.

According to another embodiment, the audio data file to be generated in correspondence to the selected script can be adapted to be generated by the UGC server, and the format of the audio data file to be generated can be adapted to be set to one selected from the formats provided by the UGC server 140 through the user interface screen.

Figure 5:
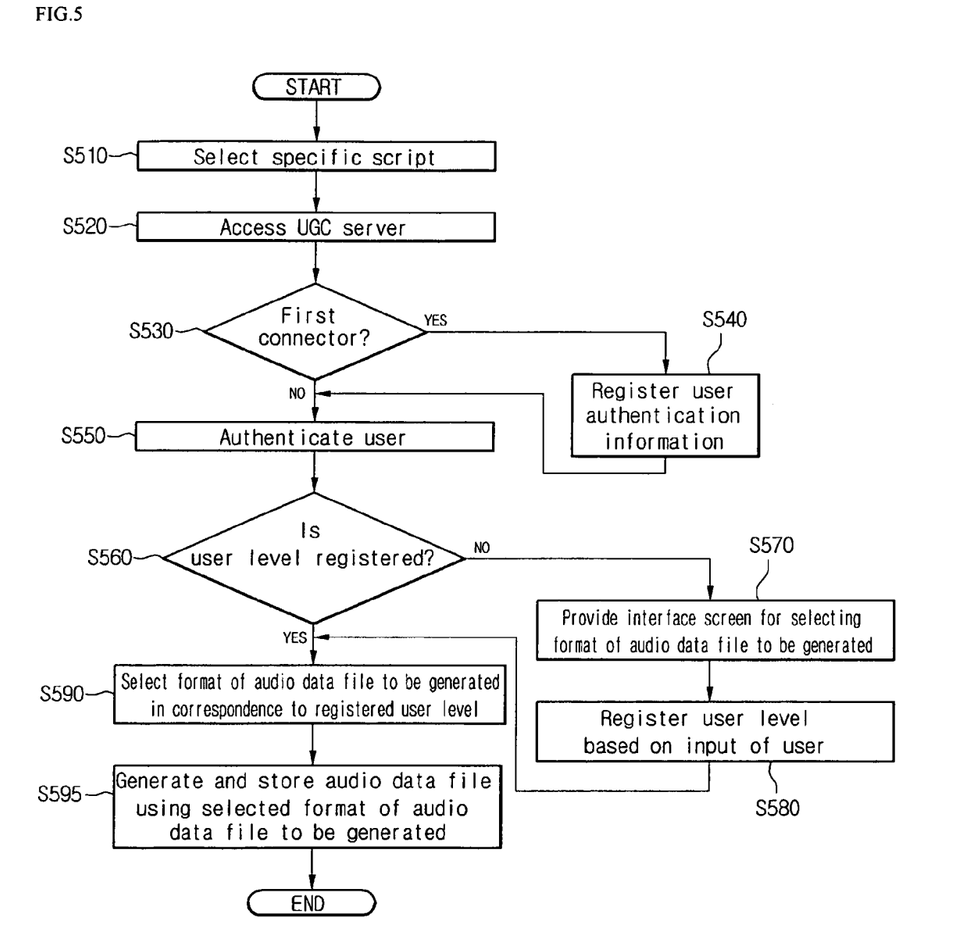
FIG. 5 is a view for explaining a method for generating digital content according to another embodiment.

Referring to FIG. 5, a predetermined script displayed on the screen of the portable terminal 110 or user PC 120 is selected by the user (S510). The user gets access to the UGC server 140, which supports the generation and operation of UGC, through the portable terminal 110 or user PC 120 (S520). When the user gets access to the UGC server 140 through the portable terminal 110 or user PC 120, the UGC server 140 determines whether or not the accessed user is a first connector (S530). As a result of the determination (S530), if the accessed user is a first connector, a process of registering user authentication information on the accessed user is first performed (S540), and then a process of authenticating the user is performed (S550). However, if the accessed user is not a first connector, the process of authenticating the user is immediately performed (S550). Subsequently, the UGC server 140 determines whether or not a user level is registered in order to determine the format of the audio data file to be generated in correspondence to the script selected by the user (S560). If the user level is not registered, the interface screen is provided such that the user can select the format of the audio data file to be generated in correspondence to the selected script (S570). The user level is registered on the basis of the input information using the provided interface screen (S580). After the process of registering the user level (S580), or when the user level is registered in step S560, the format of the audio data file to be generated in correspondence to the registered user level is selected (S590).

The format of the audio data file to be generated in correspondence to the user level can be set to the format of the audio data file capable of output the voice at a different reading speed according to the user level. For example, in the case in which the user level is classified as level 1 through level 5, the format of the audio data file is allocated so as to allow the voice to be output at a reading speed, which is a standard reading speed in level 3, which is slower than the standard reading speed of level 3 in levels 1 and 2, and which is faster than the standard reading speed of level 3 in levels 4 and 5. Thereby, the format of the audio data file to be generated in correspondence to the user level can be adapted to be automatically set to the format of the audio data file having the reading speed corresponding to the registered user level of the user accessing the UGC server 140. Further, the format of the audio data file to be generated in correspondence to the user level can be adapted to be set to the format of the audio data file to be generated such that the voice corresponding to single reading, two-times repeated reading, three-times repeated reading, or so on with respect to the selected script can be output according to the predetermined user level.

Then, the audio data file corresponding to the script selected by the user is generated according to the selected format of the audio data file, and the generated audio data file is synchronized to the corresponding script, and is stored in the database 150 (S595). On one hand, the user can immediately use the audio data file stored in the database 150 by downloading it to the portable terminal 110 or user PC 120. On the other hand, if necessary in the future, the user gets access to the UGC server 140 through the authentication process at any time, and then can use the stored audio data file by downloading it to the portable terminal 110 or user PC 120.

According to yet another embodiment, the location and format of the audio data file to be generated in correspondence to the selected script can be adapted to be selected through the user interface screen by the user, or be automatically generated and set by the UGC server 140.

Figure 6:
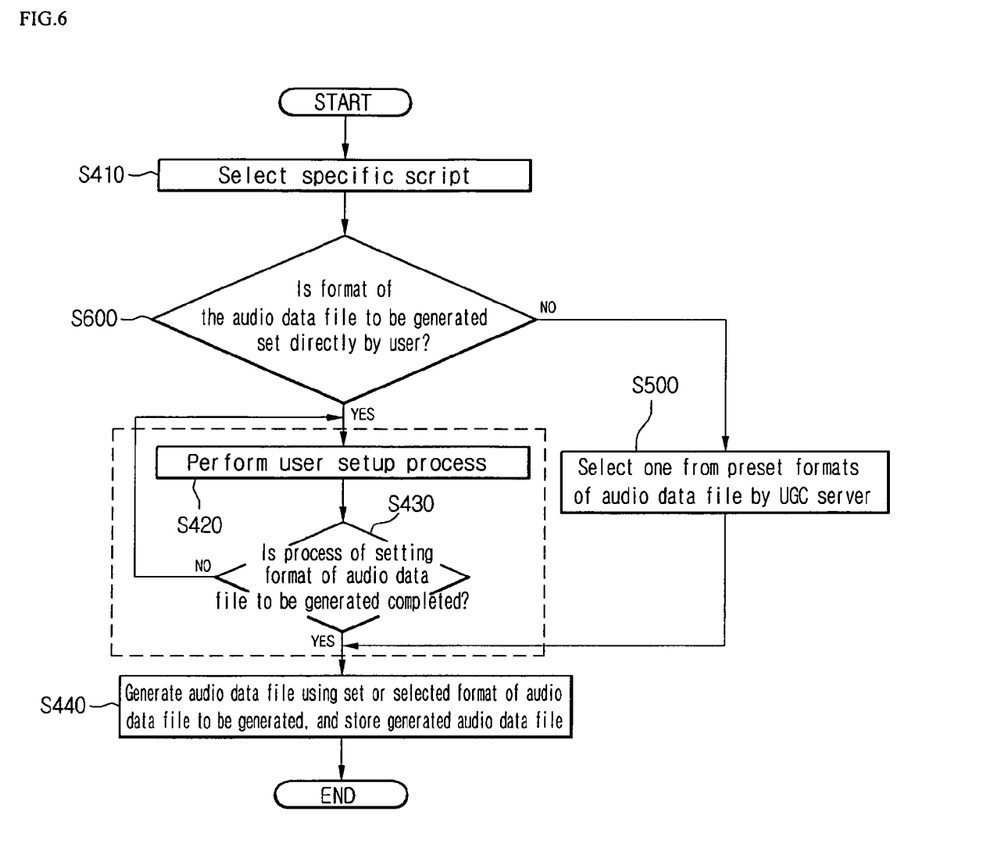
FIG. 6 is a view for explaining a method for generating digital content according to yet another embodiment.

Referring to FIG. 6, a predetermined script displayed on the screen of the portable terminal 110 or user PC 120 is selected by the user (S410). When the predetermined script displayed on the screen is selected, it is determined whether or not the user is adapted to directly set the format of the audio data file to be generated (S600). If the user is adapted to directly set the format of the audio data file to be generated, a user setup process of setting the format of the audio data file to be generated is performed (S420). Afterwards, it is determined whether or not the user setup process (S420) is completed (S430). If the user setup process of setting the format of the audio data file to be generated is completed, the audio data file corresponding to the selected script is generated in the set format of the audio data file. The generated audio data file is synchronized to the corresponding script, and then is stored in a predetermined storage means (S440). Meanwhile, if the user is not adapted to directly set the format of the audio data file, the format of the audio data file corresponding to the selected script is adapted to be set by the UGC server 140 (S500). Thereafter, the audio data file for the selected script is adapted to be generated by the UGC server 140. Then, the generated audio data file is synchronized to the corresponding script, and then is stored in the connected database 150 (S440). On one hand, the user can immediately use the audio data file generated and stored in step S440 by downloading it to the portable terminal 110 and user PC 120. On the other hand, if necessary in the future, the user gets access to the UGC server 140 through the authentication process at any time, and can use the stored audio data file as data for the language learning suitable for the user level by downloading it to the portable terminal 110 or user PC 120.

In the present disclosure, the audio data file generated based on the TTS can be classified into several types. The method for generating the audio data file can include ordinary conversion, user conversion, level conversion, and dictation conversion. The selection from these conversion modes is pre-set based on the user interface, and the TTS engine can generate the corresponding script into the audio data file on the basis of the set result so as to be suitable for the pre-set conversion. The ordinary conversion is to convert a script into voice with no change. The user conversion is to convert a script into voice by the user directly setting a section, speed, interval etc. to be converted within the script. The level conversion is to convert a script into voice by a registered user level. The dictation conversion is to generate an audio data file, for instance, by converting one sentence within a script, resting for a preset time, and converting the next sentence. The corresponding sentence is dictated for a preset inactive time. In this respect, this is expressed as the dictation conversion, but the dictation conversion can be also applied to repetition conversion. In other words, after the audio data for one sentence is reproduced, the language learning can be done by repeating the sentence for a given inactive time. As one example, in the case in which the audio data file is generated by the user conversion, the script can be also generated and displayed in the same format as determined by the user. For example, when the section repetition is set for the script or partial text within the script, the corresponding audio data file is repeated, and simultaneously the text of the section is also repeated and displayed.

The audio data file generated based on the TTS can include metadata. The metadata can be configured to be included in a header of the audio data file, be included in audio data, or be added apart from the header or the audio data. The method of including the metadata in the audio data file can be adaptively, freely selected according to format of the audio data file, performance of the terminal or server, service method, network environment, etc. by those skilled in the art.

The metadata describes the corresponding audio data. The information described in the metadata is one associated with conversion of the audio data file. As one example, the information described in the metadata can be one expressing whether or not the corresponding audio data file is the audio data converted based on the TTS. As another example, the information described in the metadata can be one expressing by what classification the corresponding audio data file is converted. For example, the information described in the metadata can be one expressing by which conversion of the ordinary conversion, user conversion, level conversion, and dictation conversion the corresponding audio data file is converted. Further, the information described in the metadata can be one expressing whether or not the corresponding audio data file is converted by a combination of at least two of the ordinary conversion, user conversion, level conversion, and dictation conversion. The information described in the metadata can include both the information expressing whether or not the corresponding audio data file is the audio data converted based on the TTS and the information expressing by what classification the corresponding audio data file is converted.

As another embodiment of the generation and management of the metadata, the audio data file generated by the TTS can have the metadata as data apart from the audio data file. When the generated audio data file has the metadata of the corresponding audio data apart from the audio data file, the metadata can be managed using a separate database. In this case, the metadata includes the information expressing whether or not the audio data file is converted based on the TTS and/or the information expressing whether or not the audio data file is converted by at least one or a combination of at least two of the ordinary conversion, user conversion, level conversion, and dictation conversion.

The metadata gives an advantage in managing or using the corresponding audio data file according to each conversion on the basis of the metadata. For example, when the audio data file generated based on the TTS is classified, it can be automatically determined based on a result of analyzing the metadata by the terminal or server that the audio data file is converted by the ordinary conversion, user conversion, level conversion, and dictation conversion. The audio data files are classified based on a result of the determination, so that the environment capable of using the audio data files according to the classification is guaranteed.

According to the embodiment, the audio learning file is generated from the predetermined script in a suitable format according to the linguistic ability level of the user, and is reproduced to allow the user to start learning, so that an efficient language learning effect suitable for the user level is provided. Further, the audio data file corresponding to the level is generated from the predetermined script through the UGC server or user PC, and is downloaded to and used in the portable terminal, so that a load for generating the audio data file is reduced from the portable terminal, and thus the portable terminal made smaller in size, lighter in weight, and lower in power consumption can make use of the audio data file for learning suitable for the user level. Furthermore, a dictionary program, an e-book program, etc. that are generally used as proprietary software are applied to the portable terminal, so that the intensive learning of a specific script is possible. In addition, when preparing a presentation based on a foreign language, the user makes a script based on the corresponding foreign language, generates audio content for the corresponding script, and continues to listen to the output of the generated audio content. Thereby, the user can easily prepare the foreign language based presentation.

What is claimed is:

1. A method for generating digital content by a portable device including a controller, the method comprising the steps of:
    selecting, by the controller in response to a user selection, a predetermined script;
    determining, by the controller based on a user command, an audio file format for converting the selected script into an audio data file, wherein the audio file format represents a way how the audio file is encoded;
    converting, by the controller, the selected script into the audio data file according to the determined audio file format,
    wherein determining the audio file format comprises:
        determining the audio file format, a section repetition setting, and an inactivity setting that sets a period of inactivity that occurs after the audio file is reproduced, and
    wherein converting the selected script comprises:
        converting the selected script into the audio data file according to the determined audio file format, the section repetition setting, and the inactivity setting.

2. The method according to claim 1, wherein the predetermined script includes one selected from a script prepared by a user and a script on a webpage provided by at least one web server connected to Internet.

3. The method according to claim 1, wherein the audio file format is set in correspondence to a user level.

4. The method according to claim 3, wherein the user level is set by a user or is automatically set by a user generated content (UGC) web server.

5. The method according to claim 1, wherein the step of converting the selected script into the audio data file is performed by a user personal computer (PC) or an UGC web server.

6. The method according to claim 1, wherein, in the step of converting the selected script into the audio data file, the converted audio data file is stored in a predetermined storage device.

7. The method according to claim 6, wherein, in the step of converting the selected script into the audio data file, the script is synchronized to the converted audio data file, and is stored in a predetermined storage region.

8. The method according to claim 1, further comprising transmitting the converted audio data file to a portable terminal together with the script synchronized to the converted audio data file.

9. A method for processing digital content by a portable device including a controller, the method comprising the steps of:
    selecting, by the controller in response to a user selection, a predetermined script;
    setting, by the controller based on a user command, an audio file format for converting the selected script into an audio data file, wherein the audio file format represents a way how the audio file is encoded;
    converting, by the controller, the selected script into the audio data file according to the audio file format, and describing information expressing the audio file format together with audio data as metadata; and
    providing, by the controller, the audio data file together with the metadata,
    wherein setting the audio file format comprises:
        setting the audio file format, a section repetition setting, and an inactivity setting that sets a period of inactivity that occurs after the audio file is reproduced, and
    wherein converting the selected script comprises:
        converting the selected script into the audio data file according to the audio file format, the section repetition setting, and the inactivity setting,
    wherein the describing information further expresses the section repetition setting, and the inactivity setting.

10. The method according to claim 9, wherein the metadata includes at least one selected from information expressing whether or not the audio data file is converted based on text-to-speech (TTS), and information expressing classification of the conversion.

11. The method according to claim 10, wherein the information expressing classification of the conversion includes at least one selected from information on ordinary conversion, information on user conversion, information on level conversion, and information on dictation conversion with respect to the script corresponding to the corresponding audio data file.

12. The method according to claim 9, wherein the providing the audio data file together with the metadata is performed by at least one of storage, transmission, and reproduction of the corresponding audio data file.

13. A method for a text-to-speech server to convert a text into an audio, comprising:

performing, by the text-to-speech server, an authentication process for a user;

receiving, by the text-to-speech server, the text from a terminal device of the user, providing, by the text-to-speech server, a first interface to the terminal device, wherein the first interface is for the user to select an audio file format, wherein the audio file format represents a way how the audio file is encoded;

providing, by the text-to-speech server, a second interface to the terminal device, wherein the second interface is for the user to designate a text section for repetition;

providing, by the text-to-speech server, a third interface to the terminal device, wherein the third interface is for the user to designate an inactive text section;

receiving, by the text-to-speech server, information on a selected audio file format from the terminal device;

receiving, by the text-to-speech server, information on a designated text section for the repetition from the terminal device;

receiving, by the text-to-speech server, information on a designated inactive text section from the terminal device;

converting, by the text-to-speech server, the text into an audio file according to the selected audio file format, the designated text section for the repetition and the designated inactive text section; and providing, by the text-to-speech server, the audio file to the terminal device.

14. The method of claim 13, further comprising:

storing, by the text-to-speech server, the audio file for the user so that the user can access the text-to-speech server through the authentication process and use a stored audio file at any time.

15. The method of claim 13, wherein the performing the authentication process comprises:

performing, by the text-to-speech server, a process of registering user authentication information for the user, if the user is a first connector; and performing, by the text-to-speech server, an authentication process for the user, if the user is not a first connector.

16. The method of claim 13, further comprising:

providing, by the text-to-speech server, a fourth interface to the terminal device, wherein the fourth interface is for the user to select a reading speed; and receiving, by the text-to-speech server, information on a selected reading speed from the terminal device, wherein converting the text comprises:

converting the text into an audio file further according to the selected reading speed.

17. A method for a terminal device, comprising:

performing, by the terminal device, an authentication process for a user;

providing, by the terminal device, the text to a text-to-speech server;

receiving, by the terminal device, a first interface from the text-to-speech server, wherein the first interface is for the user to select an audio file format, wherein the audio file format represents a way how the audio file is encoded;

receiving, by the terminal device, a second interface from the text-to-speech server, wherein the second interface is for the user to designate a text section for repetition;

receiving, by the terminal device, a third interface from the text-to-speech server, wherein the third interface is for the user to designate an inactive text section;

providing, by the terminal device, information on a selected audio file format to the text-to-speech server;

providing, by the terminal device, information on a designated text section for the repetition to the text-to-speech server;

providing, by the terminal device, information on a designated inactive text section to the text-to-speech server; and receiving, by the terminal device, a converted audio file of the text from the text-to-speech server, wherein the converted audio file complies with the selected audio file format, the designated text section for the repetition and the designated inactive text section.

18. The method of claim 17, further comprising:

re-accessing, by the terminal device, the text-to-speech server through the authentication process; and receiving, by the terminal device, the converted audio file stored in the text-to-speech server.

19. The method of claim 17, wherein the performing the authentication process comprises:

performing, by the terminal device, a process of registering user authentication information for the user, if the user is a first connector; and performing, by the terminal device, the authentication process for the user, if the user is not a first connector.

20. The method of claim 17, further comprising:

receiving, by the terminal device, a fourth interface from the text-to-speech server, wherein the fourth interface is for the user to select a reading speed; and providing, by the terminal device, information on a selected reading speed to the text-to-speech server, wherein the converted audio file further complies with the selected reading speed.

\* \* \* \* \*